United States Patent

Stellwagen

Patent Number: 5,255,657
Date of Patent: Oct. 26, 1993

[54] GAS ENGINE

[75] Inventor: Karl Stellwagen, Mannheim, Fed. Rep. of Germany

[73] Assignee: Motoren-Werke Mannheim AG, Mannheim, Fed. Rep. of Germany

[21] Appl. No.: 721,973

[22] Filed: Jun. 27, 1991

[51] Int. Cl.$^5$ .................... F02B 43/00; F02M 21/04
[52] U.S. Cl. ................. 123/527; 123/27 GE
[58] Field of Search ............ 123/435, 276 GE, 527; 48/180.1

[56] References Cited

U.S. PATENT DOCUMENTS

| 4,151,821 | 5/1979 | Wichman | 123/527 |
| 4,364,364 | 12/1982 | Subvananiam | 123/527 |
| 4,430,978 | 2/1984 | Lewis | 123/527 |
| 4,495,900 | 1/1985 | Stockmeyer | 123/527 |
| 4,617,904 | 10/1986 | Pagdin | 123/527 |
| 4,696,278 | 9/1987 | Ito | 123/527 |
| 4,843,558 | 6/1989 | Bergmann | 123/527 |

FOREIGN PATENT DOCUMENTS 0185856  10/1984  Japan .................... 123/527

Primary Examiner—E. Rollins Cross
Assistant Examiner—Erick Solis
Attorney, Agent, or Firm—Charles L. Schwab

[57] ABSTRACT

This invention relates to a gas engine, in particular a four-cycle gas engine, having a mixture line (7) to the combustion spaces in the cylinders (2) and having a mixer (5) in the mixture line (7), in which air is mixed into the fuel gas, and a metering valve (8) for the metering of the gas delivery, the metering valve (8) being actuated by a controller (4) for the control of the pollutant emission, and the controller (4) adjusting the metering valve (8) in dependence on the power setting of the gas engine (1) and an engine parameter measuring the pollutant emission.

4 Claims, 1 Drawing Sheet

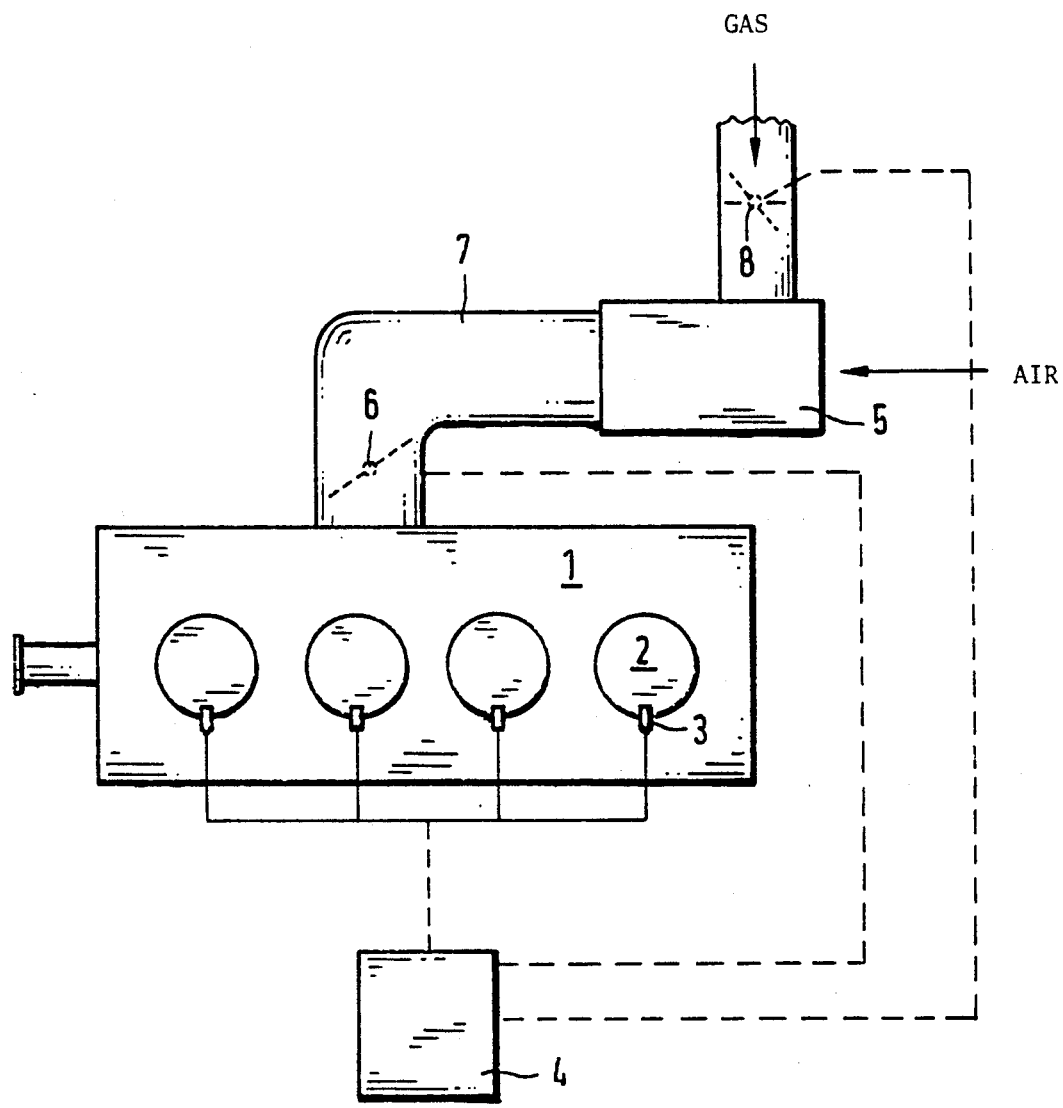

GAS ENGINE

TECHNICAL FIELD

This invention relates to an internal combustion engine which burns a combustible gas.

PRIOR ART STATEMENT

Gas engines consist of, among other components, a mixture line to the combustion spaces in the cylinders, a mixer being arranged in the mixture line, which mixer mixes air into the gas. A metering valve is provided for the metering of the gas delivery.

In order that the emission standards imposed by the legislature can be complied with, it is the state of the art to control the metering valve via a controller in dependence on the pollutant emission of the engine. For this purpose, an engine parameter measuring the pollutant emission, namely the oxygen content in the exhaust gas, and an engine power signal is supplied to the controller as control variable. In the controller, these values are compared with a setpoint, and the metering valve is accordingly controlled in such a fashion that the predetermined setpoint is attained.

A disadvantage herein is that, upon a fluctuation in gas quality, for example if propane gas is mixed into the natural gas, the pollutant emission increases while the air ratio in the exhaust gas remains constant.

OBJECTS AND BRIEF DESCRIPTION OF THE INVENTION

It is therefore an object of the invention to improve a gas engine in accordance with the preamble of claim 1 in such a fashion that the pollutant emission is low even under conditions of fluctuating gas quality and fluctuating intake air temperature.

In accordance with the invention, this object is achieved by virtue of the fact that the engine parameter is the mean temperature in the combustion space. As this temperature depends on the gas quality and the intake air temperature, this measured value is optimally suited to the control of the air ratio and thus to the abatement of pollution. This mean temperature and the associated power setting of the engine are supplied to the controller. The two values are then compared with a setpoint in the controller. Next, the metering valve is adjusted in such a fashion that the gas-air ratio takes on an optimal value for pollutant emissions.

The mean temperature is advantageously picked off or monitored via sensors, for example thermocouples.

It is sufficient to measure the mean temperature of even one combustion space. It is advantageous, however, to determine the mean temperatures of all cylinders and form a mean value from these.

In one embodiment of the invention, the power setting of the gas engine is determined via the throttle valve in the mixture line and supplied to the controller. The power setting can be monitored by a throttle position sensor.

BRIEF DESCRIPTION OF THE DRAWINGS

The single FIGURE of the drawings schematically illustrates an engine incorporating one embodiment of the invention.

DETAILED DESCRIPTION OF THE DRAWING

The FIGURE shows a gas engine 1 in accordance with the invention. Gas is delivered to the gas engine 1 via a mixture line 7. A mixer 5, which mixes air into the gas, is arranged in the said mixture line 7. Ahead of the mixer 5 there is arranged a metering valve 8 for the metering of the gas delivery. A controller 4 is provided for the control of the gas-air ratio, which controller controls the metering valve 8 in such a fashion that the gas-air ratio satisfies the requirements for low pollutant emissions.

The mean temperature of the combustion spaces or, respectively, of the cylinders is supplied to the controller 4 as control variable. These temperature values are monitored via sensors 3. The power setting of the engine is monitored by a sensor sensing the position of the throttle valve 6 in the mixture line 7, the setting of this throttle valve 6, for example, being transmitted to the controller 4. The controller compares these two values, the mean temperature and the associated power, with a stored setpoint value and accordingly controls the metering valve 8 until the measured actual values correspond to the setpoint. By this means, pollutant emissions are minimal. Since the mean temperature of the combustion spaces is input as control variable, low pollutant emissions are attained even under conditions of fluctuating gas quality and fluctuating intake air temperature.

The embodiments of the invention in which an exclusive property or privilege is claimed are defined as follows:

1. In a four cycle internal combustion-gas-engine having a plurality of cylinders (2) each with a combustion space and a mixture line (7) supplying fuel gas to said combustion spaces, the combination comprising: a mixer (5) in said mixer line (7) in which air is mixed into the fuel gas, a metering valve (8) in said mixer line (7) upstream of said mixer (5) for the metering of the fuel gas delivery, a controller (4) connected to said metering valve (8) and being operable to adjust said metering valve (8) to control pollutant emission, a throttle valve (6) in said mixture line (7) downstream of said mixer (5), means monitoring the position of said throttle valve (6) and sending a signal to said controller (4) indicative of the position of said throttle valve (6), said controller (4) adjusting the metering valve (8) in dependence on the position of said throttle valve (6) and in dependence on the mean temperature in at least one of said combustion spaces.

2. The gas engine of claim 1, wherein said mean temperature is sensed by thermocouple sensors (3).

3. The gas engine of claim 1 or 2, wherein said mean temperature is the mean temperature in all said combustion spaces.

4. The gas engine of claim 1 wherein said throttle valve position is monitored by an electrical throttle position sensor.

* * * * *

UNITED STATES PATENT AND TRADEMARK OFFICE
CERTIFICATE OF CORRECTION

PATENT NO.   :   5,255,657
DATED        :   Oct. 26, 1993
INVENTOR(S)  :   Karl Stellwagen It is certified that error appears in the above-identified patent and that said Letters Patent is hereby corrected as shown below:

On the cover page insert

"[30]    Foreign Application Priority Data
    June 27, 1990 [DE]   Fed. Rep. of Germany ...... P 40 20 453.7"

Signed and Sealed this

Seventeenth Day of May, 1994

*Attest:*

BRUCE LEHMAN

*Attesting Officer*    *Commissioner of Patents and Trademarks*